United States Patent [19]

Guerard

[11] Patent Number: 4,831,679
[45] Date of Patent: May 23, 1989

[54] WIPER ARM ASSEMBLY FOR MOTOR VEHICLES

[75] Inventor: Norbert Guerard, Virton, Belgium

[73] Assignee: Champion Spark Plug Europe S.A., Binche, Belgium

[21] Appl. No.: 179,888

[22] Filed: Apr. 11, 1988

[30] Foreign Application Priority Data

Apr. 22, 1987 [GB] United Kingdom ............... 8709496

[51] Int. Cl.[4] .............................................. B60S 1/18
[52] U.S. Cl. ................................................ 15/250.21
[58] Field of Search ........... 15/250.13, 250.21, 250.23, 15/250.30

[56] References Cited

U.S. PATENT DOCUMENTS

| 1,660,971 | 2/1928 | Lindner | 15/250.23 |
| 2,308,212 | 1/1943 | Scott-Iversen et al. | |
| 3,003,173 | 10/1961 | Ziegler | |
| 4,447,928 | 5/1984 | Schuch et al. | |
| 4,625,359 | 12/1986 | Egner-Walter et al. | |

FOREIGN PATENT DOCUMENTS

| 901052 | 5/1985 | Belgium . |
| 903681 | 3/1986 | Belgium . |
| 1561319 | 2/1969 | France . |
| 2563788 | 3/1985 | France . |
| 2162053 | 1/1986 | United Kingdom . |

Primary Examiner—Peter Feldman
Attorney, Agent, or Firm—Wood, Dalton, Phillips, Mason & Rowe

[57] ABSTRACT

The invention relates to a wiper arm assembly for motor vehicles, comprising an oscillating mounting head (1), a rod (2) rigidly secured to the mounting head (1), a slidable element (3) pivotally (12) secured to a channel (4) and arm extension (7) and capable of sliding on said rod (2). Inside the channel (4) spring means are provided which are capable of biasing the arm extension (7) towards the surface to be wiped. A stationary bar (8) is rigidly attached to the vehicle body and a movable bar (9) is pivotally secured (10) to the stationary bar (8) at one of its ends and pivotally secured (11) to the slidable element (3) at the other of its ends. When the mounting head (1) and said rod (2) are oscillating the movable bar (9) oscillates too and imparts a back and forth movement to the slidable element (3), to the channel (4) and to the arm extension (7). A radial movement is thus superimposed on the oscillating movement.

8 Claims, 1 Drawing Sheet

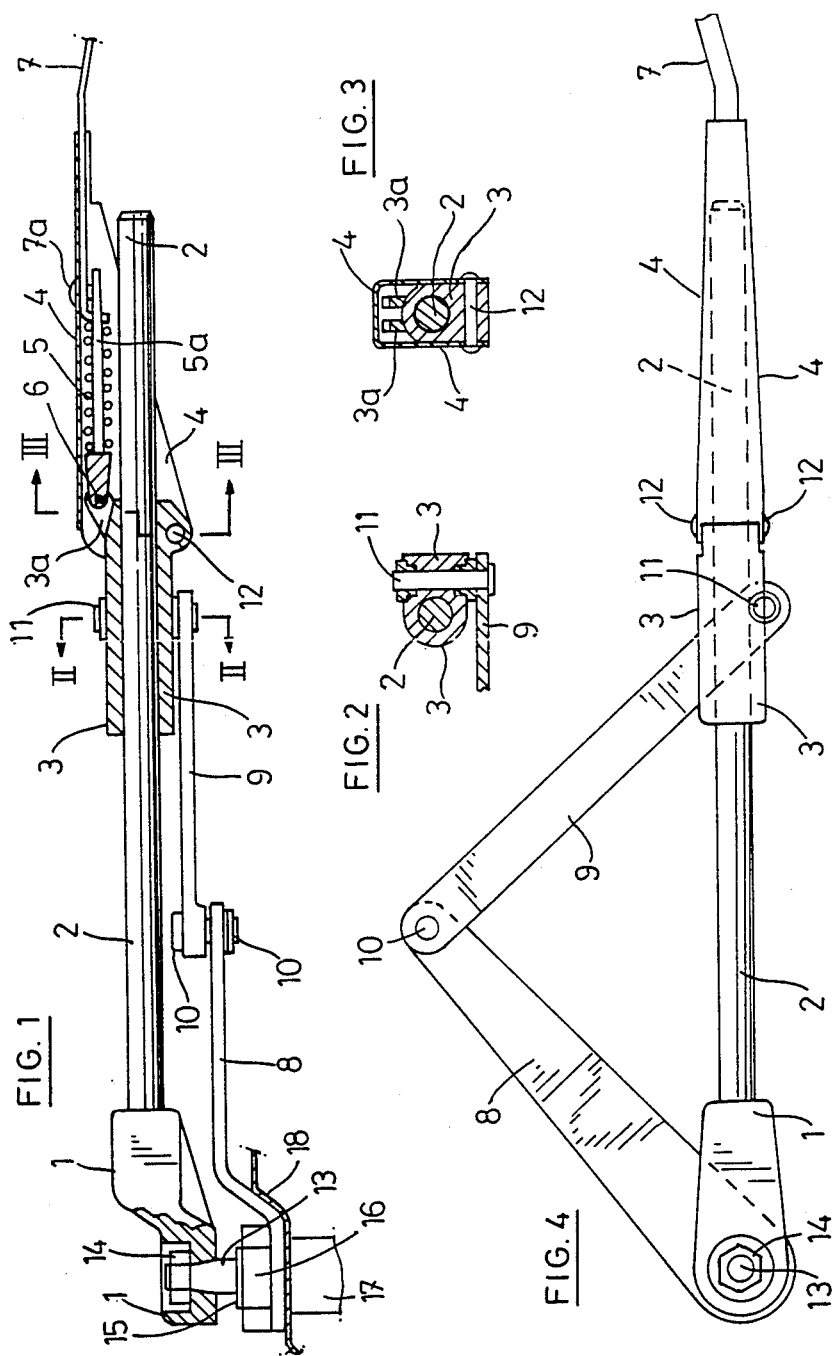

WIPER ARM ASSEMBLY FOR MOTOR VEHICLES

The present invention relates to a wiper arm assembly for motor vehicles or the like, comprising a mounting head rigidly secured to a drive shaft, an arm extension and spring means located inside a channel and capable of biasing the arm extension towards the surface to be wiped.

In particular the invention relates to a wiper arm assembly which is capable of imparting to the wiper blade not only an oscillating movement, but also a superimposed radial movement with respect to the drive shaft of the assembly.

Wiper arm assemblies or systems of the thus defined type are well known in prior art. The superimposed radial movement in the prior art systems is generally obtained either by gear means or by linkage means. In the wiper arm assembly according to the invention said radial movement is obtained by linkage means, i.e. by the judicious disposition of a certain number of stationary and/or movable bars.

Prior art wiper arm assemblies provided with such linkage means are for example disclosed in Belgian patents Nos. 901,052 and 903,681 and in French patent application No. 2,563,788. The main disadvantage of the prior art wiper assemblies is the fact that they comprise a relatively large number of bars and, consequently, of articulations such as pivot, prismatic or spherical articulations. Moreover, because of the bad distribution of the forces acting on the different bars the attachment of said bars to the vehicle body must be very strong and thus relatively expensive.

The above drawbacks of the prior art wiper systems are eliminated in the wiper arm assembly according to the invention because its linkage means comprises only one stationary bar and only one movable bar and because only the stationary bar is rigidly attached to the vehicle body.

The object of the invention is thus to provide a wiper arm assembly, of the above defined type, which imparts a complex movement, i.e. an oscillating and a superimposed radial movement, to the wiper blade by means of a minimum of bars and of articulations.

The wiper arm assembly according to the invention is substantially characterized by the fact that it also comprises a rod rigidly secured to the mounting head, a slidable element pivotally secured to the channel and capable of sliding on said rod, a first bar rigidly secured to the vehicle body and a second bar pivotally secured at one of its ends to the first bar and, at the other of its ends, to the slidable element.

Other, secondary features of the wiper arm assembly according to the invention are for example the fact that said spring means is a tension or a compression spring and that said spring means is either located above or laterally with respect to the rod on which slides the slidable element.

The wiper arm assembly according to the invention will be better understood when reading the following portions of the description in conjunction with the appended drawings, wherein FIG. 1 is an elevational/sectional view of the wiper arm assembly according to the invention, FIG. 2 is a sectional view, along line II—II, of the wiper arm assembly of FIG. 1, FIG. 3 is a sectional view, along line III—III, of the wiper arm assembly of FIG. 1, FIG. 4 is a top view of the wiper arm assembly of FIG. 1.

As shown in FIG. 1, the mounting head 1 of the wiper arm assembly according to the invention is rigidly attached, by means of the nut 14 and as known in prior art, to the drive shaft 13 which is located inside the housing 17. It is to be noted that the drive shaft 13 passes through the annular element 15 (screw), the nut 16, the car body 18 and the housing 17 without touching said four elements. The oscillating movement of the drive shaft 13 is thus only transmitted to the mounting head 1.

However, the rod 2 is rigidly secured to the mounting head 1 and thus said rod 2, the slidable element 3, the channel 4, the spring means 5 and the arm extension 7 oscillate with and in the same manner as the mounting head 1 and as the drive shaft 13.

As already said above the slidable element 3 is capable of sliding on the rod 2 and it is pivotally linked (12) to the channel 4. The slidable element is also pivotally linked (3a, 6) to the spring means 5 which in FIG. 1 is a compression spring and therefore comprises a guiding rod 5a. The rivet 7a secures the arm extension 7 to the channel 4. The spring 5 is located inside the channel 4 and is capable of biasing the arm extension 7, and thus the wiper blade (not shown), towards the surface to be wiped.

The wiper arm assembly according to the invention further comprises the stationary bar 8 and the movable bar 9. The stationary bar 8 is rigidly secured to the vehicle body by the screw/nut means 15, 16 and the movable bar 9 is pivotally secured (10) to the stationary bar 8 at one of its ends and pivotally secured (11) to the slidable element 3 at the other of its ends.

It is to be noted that in the appended drawings the geometrical axis of the drive shaft 13 and the longitudinal axis of the stationary bar 8 intersect. This however is not necessarily so, i.e. the stationary bar 8 can also be rigidly secured to the vehicle body 18 at a location such that said two axes do not intersect.

The thus described new wiper arm assembly works as follows:

(a) When the mounting head 1 and the rod 2 rotate counterclockwise (FIG. 4) under the action of the drive shaft 13 the movable bar 9 rotates counterclockwise about the pivot pin 10 and thus pushes the slidable element 3, the channel 4 and the arm extension 7 away from the mounting head 1.

(b) The wiper arm will be at its maximum extension when the two bars 8,9 are in alignment, i.e. when the geometrical axes of the rod 2 and of the stationary bar 8 are located in the same vertical plane (FIG. 4).

(c) When the rod 2 rotates clockwise or counterclockwise away from the position defined in point "b" the slidable element 3, the channel 4 and the arm extension 7 will move towards the mounting head 1, i.e. the wiper arm will retract.

I claim:

1. A wiper arm assembly for motor vehicles or the like, comprising a mounting head (1) rigidly secured to drive shaft (13), an arm extension (7) and spring means (5) located inside a channel (4) and capable of biasing the arm extension (7) towards the surface to be wiped, characterized in that it also comprises a rod (2) rigidly secured to the mounting head (1), a slidable element (3) pivotally secured to the channel (4) and capable of sliding on said rod (2), a first bar (8) rigidly secured to the vehicle body (18) and a second bar (9) pivotally secured at one of its ends to the first bar (8) and, at the other of its ends, to the slidable element (3).

2. A wiper arm assembly according to claim 1, characterized in that the geometrical axis of the drive shaft (13) and the longitudinal axis of the first bar (8) intersect.

3. A wiper arm assembly according to claim 1 characterized in that said spring means is a compression spring (5).

4. A wiper arm assembly according to claim 2 characterized in that said spring means is a compression spring (5).

5. A wiper arm assembly according to claim 1 characterized in that said spring means is a tension spring.

6. A wiper arm assembly according to claim 2 characterized in that said spring means is a tension spring.

7. A wiper arm assembly according to claim 1 characterized in that said spring means (5) is located above said rod (2).

8. A wiper arm assembly according to claim 2 characterized in that said spring means (5) is located above said rod (2).

* * * * *